June 6, 1961  W. C. KNOX ET AL  2,987,245
CROSSFOOTER CLEAR SIGNALING MECHANISM
Filed Jan. 27, 1958  3 Sheets-Sheet 1

INVENTORS
WILLIAM C. KNOX.
STANLEY E. DENZINGER.
BY
Wallace P. Lamb
ATTORNEY.

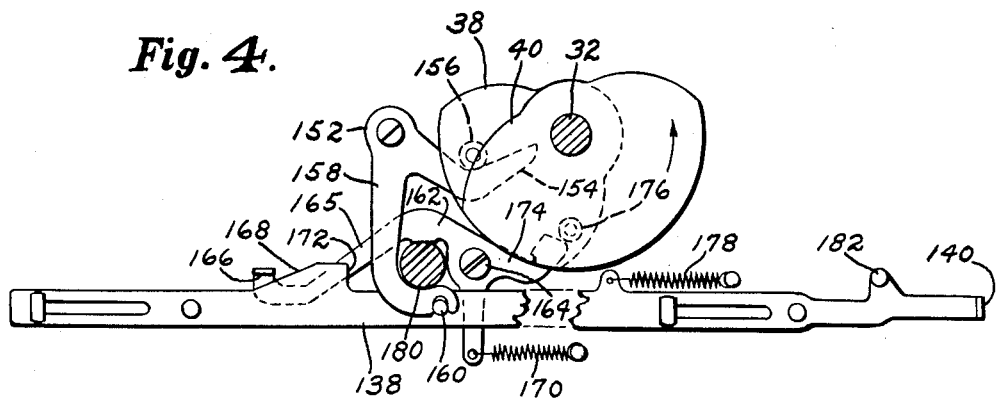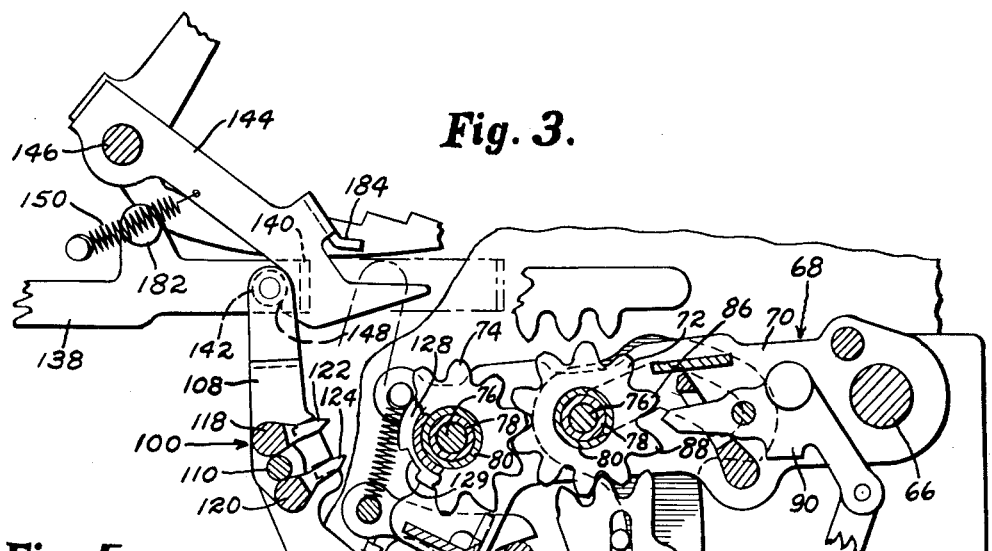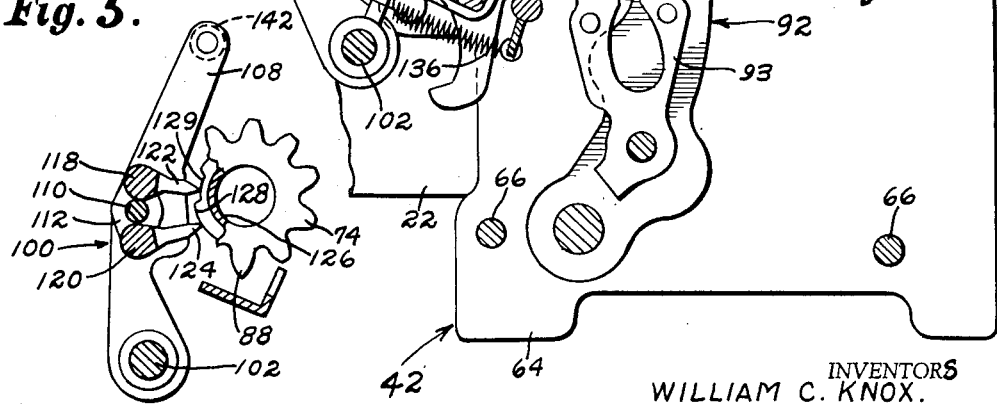

June 6, 1961
W. C. KNOX ET AL
2,987,245
CROSSFOOTER CLEAR SIGNALING MECHANISM
Filed Jan. 27, 1958
3 Sheets-Sheet 3
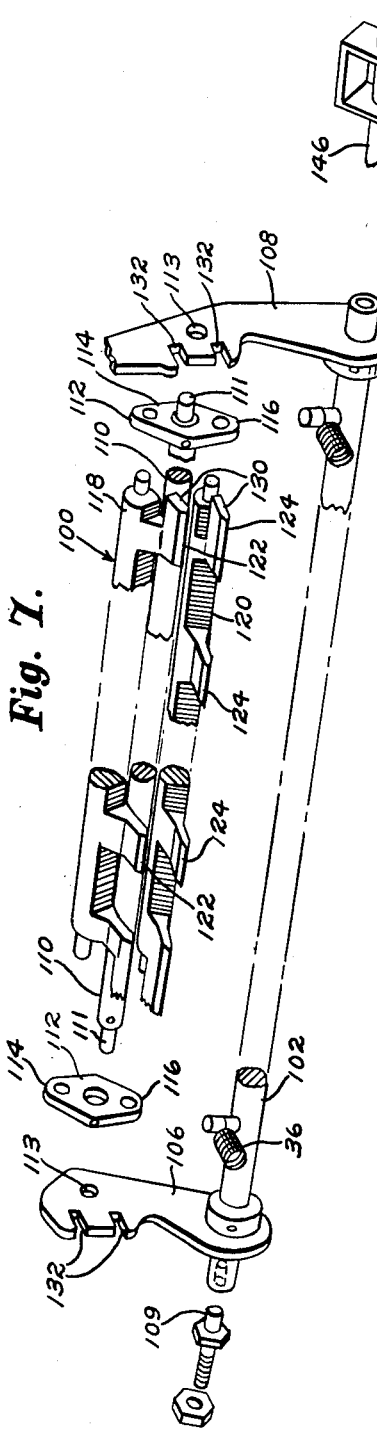
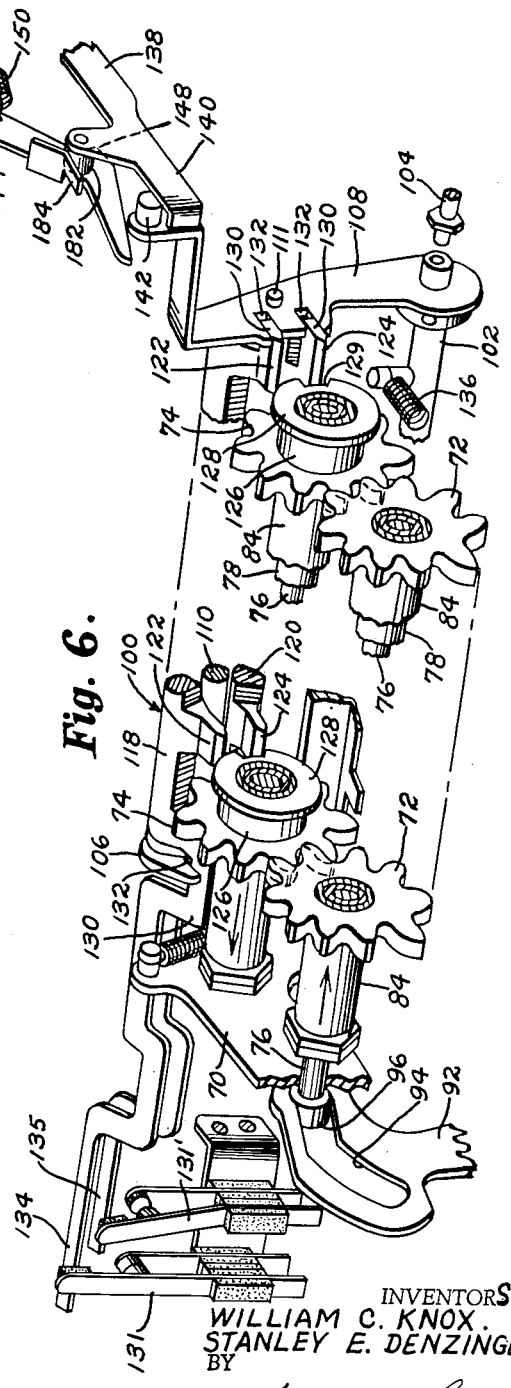
INVENTORS
WILLIAM C. KNOX.
STANLEY E. DENZINGER.
BY
Wallace P. Lamb
ATTORNEY.

United States Patent Office 2,987,245
Patented June 6, 1961

2,987,245
CROSSFOOTER CLEAR SIGNALING MECHANISM
William C. Knox, Detroit, and Stanley E. Denzinger, Livonia, Mich., assignors to Burroughs Corporation, Detroit, Mich., a corporation of Michigan
Filed Jan. 27, 1958, Ser. No. 711,381
3 Claims. (Cl. 235—60.2)

This invention relates generally to calculating machines of the type having a crossfooter and particularly to a non-clear signal system for the crossfooter.

In accounting or calculating machines of the type having a crossfooter and particularly machines having one or more registers, it is possible for the crossfooter to contain an amount due either to erroneous entries or to mechanical limitations that create an error in the account without the operator discovering such error until long after it is made. Heretofore, it has been the practice to use a sensing device to sense whether the crossfooter was clear and/or not clear and to actuate a signal accordingly, but such sensing devices did not meet the exigencies of all crossfooter non-clear situations that arose. One such situation arises when for any reason, the crossfooter capacity is reached such that the wheels thereof all stand in their "nine" positions. Because of mechanical limitations of crossfooter and associate mechanisms, a clear condition will be sensed by the sensing device when the crossfooter amount wheels are all in their "9" positions. Another erroneous condition develops when an error of "—1" exists in a register, as the complemental equivalent of "—1" in the registers is all "9's," which when transferred to the crossfooter, positions all the wheels thereof in their "9" positions.

Accordingly, it is an object of the present invention to provide an improved crossfooter non-clear signal system which will respond to all of the exigencies in connection with non-clear crossfooter conditions.

More specifically, it is an object of the invention to provide a crossfooter condition responsive control system which will indicate the existence of a crossfooter non-clear condition although the sensing means may in fact be in crossfooter clear position.

Another object of the invention is to provide a crossfooter sensing device control system having a control operable to effect a non-clear signal in response to the existence in the crossfooter of all "nines" following a negative subtract operation.

Other objects of the invention will be apparent from the following detail description, taken in connection with the accompanying drawings in which;

FIG. 3 is a fragmentary side view, partly in section, of a crossfooter of the machine;

FIG. 4 is a fragmentary side view of certain operating details of the crossfooter;

FIG. 5 is a detail end view partly in section of a crossfooter sensing device;

FIG. 6 is a fragmentary perspective view of the crossfooter and our sensing device associated therewith, and FIG. 7 is an exploded, perspective view of our sensing device.

Figure 1:
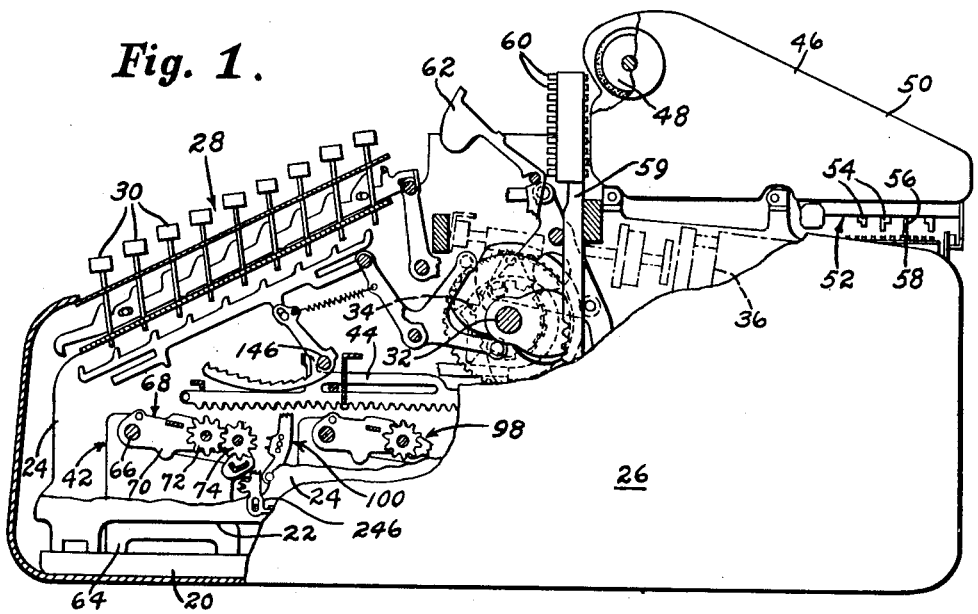
FIG. 1 is a side view, partly broken away and in section, of a calculating machine embodying features of our invention.

Referring to the drawings by characters of reference, the accounting or calculating machine shown in FIG. 1 is a well known type having the usual base 20 on which is mounted the main frame of the machine, designated generally by the number 22. The main frame 22 includes spaced upright side plates 24 on which most of the various mechanisms of the machine are mounted, the frame 22 and said mechanisms being enclosed by a housing 26. Adjacent the front of the machine is the usual keyboard 28 having rows of keys of which only a single row is shown, the row of keys shown being a row of amount indexing keys 30. Such machines, of course, have several rows of keys, including keys for taking sub-total and total operations, and a motor bar (not shown) for effecting cycling of the machine.

Rearwardly of the keyboard 28 is a main cam shaft 32 from which most of the machine operations are effected, the shaft 32 being driven through a clutch 34 by an electric motor 36. On the shaft 32 are a number of cams for controlling operations of the machine, the only ones with which the present invention is concerned being cams 38 and 40, shown in FIG. 4.

Mounted above the base 20 and between the side plates 24 below the keyboard 28, is a crossfooter 42 of a well known type that accumulates amounts indexed by the amount keys 30 when the machine is cycled, such as by operation of the motor bar. The amount keys 30 control the positions of slidable amount racks 44 which operate the crossfooter 42 in the well known manner.

Near the rear, and above the machine housing 26 is a carriage 46 for a printing platen 48, enclosed by a casing 50. As is well known, the carriage 46 is slidably mounted on the machine frame for travel transversely of the frame in accordance with the various operations of such machines. Carried by the carriage 46 on the underside thereof, is an accounting program device, designated generally by the numeral 52 which controls certain operations of the machine in accordance with the position of the carriage 46. In general, the program device 52 includes a plurality of depending sensing pins 54, which, among other things, controls the crossfooter in the performance of different functions, such as the taking of sub-totals, totals, etc. One of the pins 54 is designated by the numeral 56, and as will later be understood, controls our crossfooter non-clear signal system, hereinafter described, by closing a switch 58 (see FIG. 2) at the proper time.

Forwardly and adjacent the platen 48 is a conventional printing mechanism which includes a vertically movable printing head 59 having a plurality of print elements 60 that may be selectively positioned in printing relation to the platen 48. Pivoted forwardly of the print elements 60 is a print hammer 62 to strike the selected print element to effect a printing operation in cooperation with the platen 48.

The crossfooter 42 is operated by the amount racks 44 to accumulate or store the amounts indexed by the keys 30, so that sub-totals and totals may subsequently be taken. Preferably the crossfooter 42 is mounted on a support or frame including a pair of uprights or standards 64 that are rigidly mounted in the side plates 24 in spaced relation widthwise thereof. The standards 64 are rigidly secured together by a number of rods 66 which also function as fixed shafts for rotatably supporting various components of the crossfooter 42. One such component is the rockable crossfooter assembly, designated generally by the numeral 68, that includes a set of add and subtract pinions 72 and a set of total taking subtract pinions 74. The assembly 68 further includes spaced arms 70 pivoted on rod 66 and connected for rocking movement together by several connecting members, including a pair of spaced parallel rods 76 (FIG. 3). On each of the rods 76 is a tubular shaft 78 on which the pinions 72 and 74 rotate, the pinions preferably having bushings 80 and spaced apart by tubular spacers 84 (FIG. 6). As shown, pairs of the pinions 72 and 74 are in meshed relation, the pinions being arranged respectively below the amount racks 44 for operation thereby. As is the usual practice in crossfooters, the pinions 72 and 74 each have ten teeth corresponding to digit characters 0 to 9. With particular reference to FIG. 3, which shows the pinions 74 in zero positions, the teeth designated 86 are the "9" teeth and the longer teeth designated 88 are the "0" teeth. When the tooth 86 of pinions 72 is in the "9" position, as shown in FIG. 3, and a plus amount is entered, the pinion 72 is rotated and its tooth 88 engages and pivots a lever 90 which through connecting linkage actuates a transfer mechanism 93 that transfers one digit to the next higher order pinion, as pinion 72 turns to zero position.

The pinion shafts 78, and consequently the pinions 72 and 74 thereon, are shiftable longitudinally on their supporting rods 76 for the purpose of positioning either the add and subtract pinions 72 or the total taking subtract pinions 74 in positions for engagement by the racks 44. When shifting of the shafts 78 occurs, they are shifted in unison in opposite directions, the movement, of course, being insufficient to cause disengagement of the meshed pinions 72, 74. As is well known, shifting of the pinions 72, 74 is controlled in current calculating machines by a key operation or by the carriage 46 through interconnecting mechanism (not shown).

At a predetermined period during the cycling operation of the machine, the assembly 68 is rocked from its normally down position shown, upwardly to position the pinions 72 or 74, as the case may be, for engagement by the racks 44. The mechanism for rocking the assembly 68 is controlled by a key, and also by the carriage 46, by well known mechanism which may include a rockable cam 92 (see FIG. 6) having a cam slot 94 receiving a follower 96 on rod 76.

All of the above described devices and mechanisms are well known in the art and therefore have not been shown or described in detail. For a complete showing and description of the calculating machine, reference may be had to the patent to Thomas M. Butler, U.S. Patent No. 2,629,549.

Associated with the crossfooter 42 is a sensing device 100 for sensing clear and non-clear conditions of the crossfooter 42 both for positive and negative amounts. This sensing device 100 is mounted on a rocker shaft 102 that is rotatably supported at its opposite ends on studs 104 which are secured in and to the opposite frame plates 24 of the machine. As shown, the rotatable shaft 102 is parallel with the shaft 78 of pinions 72, 74 and is disposed below and slightly rearward of the subtract pinions 74, (see FIG. 3). Fixed to the shaft 102 to rotate therewith is a pair of arms 106, 108 that are spaced apart longitudinally of the shaft 102 and extend upwardly therefrom. Pivotally mounted at its opposite ends on the arms 106, 108 is a second rocker shaft 110, the shaft having studs 111 at opposite ends thereof which are rotatably received in apertures 113 in arms 106 and 108 respectively, (see FIG. 7). Secured to each end of the rocker shaft 110 to rotate therewith is a mounting member, or lever, 112 each of which has oppositely directed arms 114, 116 that extend lengthwise of the rocker arms 106, 108 in close proximity thereto. Extending between and supported by the mounting members 112 and thus supported by shaft 110, is a pair of elongated parallel sensing members 118, 120 of which the sensing member 118 senses the crossfooter pinions for positive amounts, and the sensing member 120 senses the pinions for minus amounts.

The sensing members 118 and 120 are individually pivoted at opposite ends thereof to corresponding arms of the pair of levers 112, the arrangement being such that the rocker shaft 110 extends parallel with and between the sensing members 118, 120 with the axes of the shaft and sensing members in substantially the same plane. At this point, it should be noted that the sensing members 118, 120 are pivotal about the axis of rocker shaft 110 and are also pivotal relative thereto on the levers 112 and to each other, providing cooperative, but individual movement of the sensing members.

Each of the sensing members 118, 120 includes a plurality of similar sensing fingers 122, 124 respectively, which are spaced apart longitudinally of the sensing members and may be integral therewith, as shown. The sensing fingers 122, 124 extend laterally from their axes of rotation, the fingers 122 being directly above the fingers 124 such that there are a plurality of pairs of the fingers with each pair comprising an upper positive sensing finger and a lower negative sensing finger. A pair of these sensing fingers 122, 124 is provided for each pair of the meshed pinions 72, 74. At their opposite ends, the sensing fingers 122 and 124 are provided with opposite end extensions 130 which, like the fingers, are of blade-like configuration and engage in slots 132 in the rocker arms 106, 108. The extensions 130 have loose fits in the slots 132 so that the sensing fingers may pivot in opposite directions, limited by the sides of the slots 132.

Each of the pinions 72 is provided with a hub 126 on which there is a cam 128 having its center of rotation concentric with the pinion shaft 78. The cam 128 constitutes a movable member that moves or rotates in accordance with rotation of the pinions 74 and thus the position of each of the cams 128 is indicative of the amount position of its pinion 74. The cams 128 are arranged such that the sensing fingers 122, 124 will engage the cam surfaces when the sensing device 100 is rocked toward the cams during the sensing operation.

Figure 2:
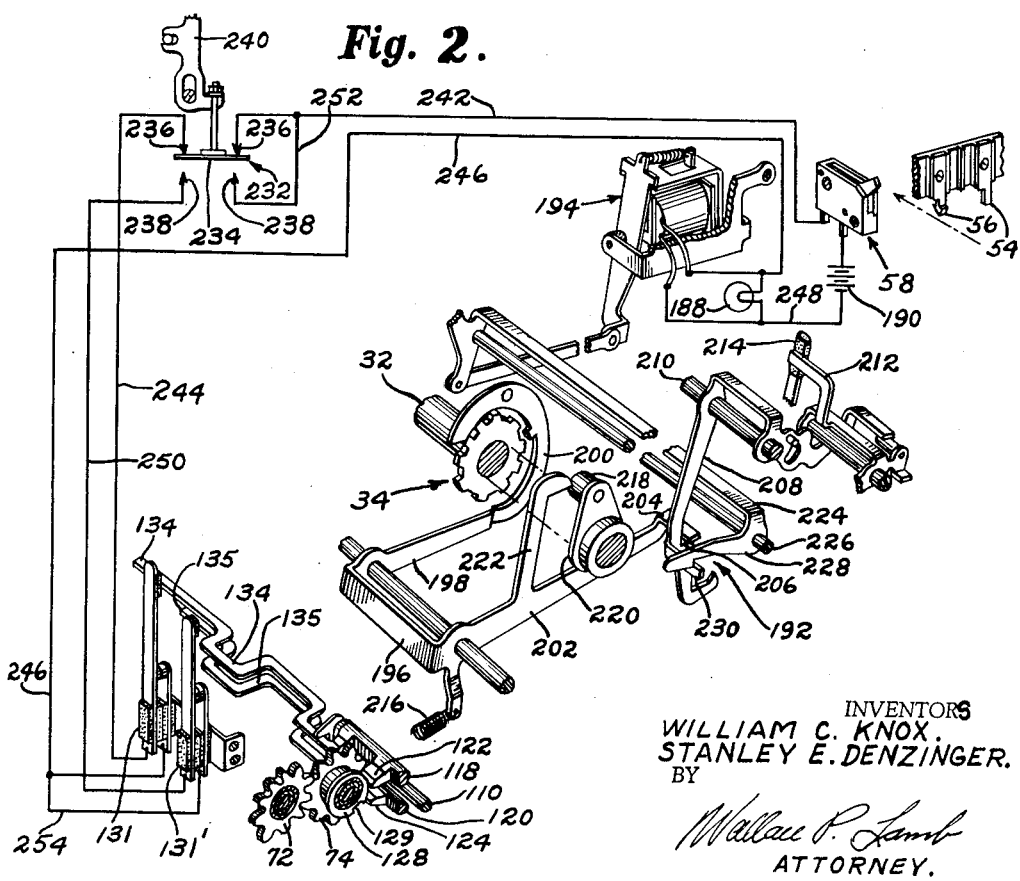
FIG. 2 is a fragmentary perspective view of our crossfooter non-clear signal system including certain components of the machine.

Preferably, the cams 128 each have a substantially uniform surface interrupted only by a slot which provides a recessed surface portion, 129 for sensing by the fingers. The recessed surface 129 of each cam 126 is located to correspond to a clear condition of its respective pinion 74 and is arranged for engagement by either the positive sensing fingers 122 or the negative sensing fingers 124, as the case may be. For example, following the indexing of positive amounts into the crossfooter, the sensing device is moved into engagement with the cams 128 and if the crossfooter is cleared of all amounts, then the upper sensing fingers 122 will extend into the cam slots and engage the recessed surfaces 129 of the cams. If, however, the amounts entered in the crossfooter were credit or negative values, the lower sensing fingers 124 engage in the notches of the cam, the difference of one space in turning of the pinions to clear minus amounts from the crossfooter being due to the well known fact that on entering a negative amount into a clear crossfooter a so-called automatic "1" is added thereto. Whether the upper sensing fingers 122, or the lower sensing fingers 124 engage the cam recessed surfaces 129 the sensing members 118 are caused to rock about shaft 110 and actuate one or the other of a pair of switches 131 and 131'. The switches 131 and 131' are normally biased to closed positions and one or the other of them is moved to open position when sensing device 118 is rocked, depending upon which of the sensing fingers engage in the cam slots. To this end, each of the sensing members 118 and 120 are provided with a switch operator or operating arm 134 and 135 respectively, in the form of extensions that extend in parallel relation from the left ends of the sensing members 118, 120, facing FIG. 6. The switch operating arm 134 is arranged to engage and move the blade of switch 131 to open position upon rocking of the sensing members 118, 120 about shaft 110 in a counter-clockwise direction (FIG. 2), when upper sensing fingers 122 engage the recessed surfaces 129 of cams 128, i.e., when a positive amount is cleared from the crossfooter. Similarly, the switch operating arm 135 is arranged to engage and move the blade of the other switch 131' to open position as the sensing members 118, 120 rock about shaft 110 in a clockwise direction (FIG. 2), when the lower sensing fingers 124 engage the recessed cam surfaces 129, i.e., when a negative amount is cleared from the crossfooter. When one or more of the sensing members have both sensing fingers 122, 124 engaging the outer periphery of the cam 128, as shown in FIG. 2, a non-clear condition of the crossfooter is indicated and as no rocking motion is imparted to the sensing members 122, 124, both switches 131 and 131' remain in their normally closed positions.

Any suitable mechanism may be used to rock the sensing device into and out of sensing relationship with the cams 128. In the present machine, the sensing device is urged toward the cams 128 by tension springs 136 which are overcome by mechanism including a timing slide 138, which operates to pivot the sensing device 100 to the retracted position of the sensing device shown in FIG. 3. The slide 138 is provided on one end thereof with an abutment 140 in the path of engagement with a stud 142 carried by the upper end of the sensing device arm 108. The springs 136 may have ends thereof attached to arms on shaft 102 and have their other ends anchored to the standards 64 of the crossfooter assembly. A pawl 144, pivoted on a shaft 146 is adapted to latch the sensing device in retracted position, the pawl 144 having a latching shoulder 148 engageable with the stud 142 that is carried by the arm 108. A coil spring 150 urges the pawl 144 into latching engagement with the stud 142. The slide 138 is operated by the timing cams 38 and 40 on main cam shaft 32, interconnected by a bell crank lever 152. Lever 152 has a cam arm 154 engageable by a stud 156 on cam 38 and has a depending arm 158 provided with a hooked end engaging a stud 160 carried by the slide 138. A latch 162, pivoted at 164 is provided to latch the slide 138 in its rearward position following retraction of the sensing device by the slide. The latch 162 has an arm 165 provided with a lug 166 on the end thereof which on movement of the slide 138 rearwardly, or to the left, facing FIG. 4, rides up an incline 168 on the upper edge of the slide and is swung down by the influence of a spring 170 to engage a shoulder 172 on the slide to lock the slide in retracted position. The latch 162 has a second arm 174 which is adapted to be depressed by engagement therewith of a stud or roller 176 carried by cam 40. When cam 40 pivots latch 162, the slide 138 will be released and will be moved forward by a spring 178. Movement of the latch 162 by the spring 170 is limited by a stop 180.

The position of the sensing device shown in FIG. 5 is the normal position in which the sensing fingers 122, 124 are in engagement with the cams 128 prior to cycling of the machine. When cycling of the machine is initiated, such as by depression of the motor bar, cam 38 pivots lever 152 and moves the slide to the left (FIG. 4), which retracts the sensing device 100, moving it to the retracted position shown in FIG. 3. In this position, the pawl latch 144 is in latching engagement with the stud 142 on arm 108 to hold the sensing device 100 in latched position, and latch lug 166 is behind shoulder 172 holding the slide 138 in retracted position. Following retraction of the sensing device 100, the amounts are entered into the crossfooter which is thereafter raised to be engaged by the racks 44. As the amount in the crossfooter increases, amounts are transferred from one order of pinion to the next higher order by the transfer mechanism 93. When the machine cycle is near completion, stud 176 on the cam 40 engages and actuates latch 162 to release slide 138. Slide 138 is then shifted forwardly or to the right, facing FIG. 4, by the spring 178. As the slide 138 moves forwardly, a roller 182 carried by the slide engages a cam 184 on pawl latch 144 moving the latch upwardly, and thereby releasing arm 108 of the sensing device 100. The sensing device 100 is now rocked toward the cams 128 by the springs 136 until the fingers 122, 124 engage the cam surfaces. This occurs each cycle of operation of the machine to allow the sensing fingers 122, 124 to sense whether the machine crossfooter is clear or not clear, as the case may be.

Designated in general by the numeral 98 is a well known type of register in which indexed amounts may be stored for subsequent transfer to the crossfooter for a crossfooter clearing operation. The register 98 is not shown or described in detail as such devices are well known to those skilled in the art and forms no part of the present invention. For a complete showing and description of the register 98, reference may be had to the U.S. patent to Thomas M. Butler, No. 2,721,695. As is well known, the nature of registers is such that they will not give a true credit or minus balance but instead give the complement of the amount. As a result, if there should be an error of minus "1" indexed into the register, the complement of which is, of course, "9," then all of the register wheels would be in the "9" positions and subsequently after a transfer from a register to the crossfooter, all of the crossfooter pinions would be in their "9" positions. When this condition exists, the lower sensing fingers will engage in the cam notches, engaging surfaces 129 and erroneously sensing a clear crossfooter condition.

In order to indicate to the machine operator, whether the crossfooter 70 is clear or not clear, a signal 188 (see FIG. 2) is provided and controlled by the sensing fingers 122, 124. The signal 188 may be of any suitable type, such as the electric lamp shown. The lamp 188 may be connected in circuit with the sensing device operated switches 131, 131' and the carriage operated switch 58, as shown. The switches 131, 131' and 58 are connected to a suitable source of electric power 190. A second signal 192 in the form of a lock may be provided to prevent operation of the machine, if the crossfooter 70 is not clear. The lock 192 is operatively connected to the conventional clutch tripping mechanism of the machine and is actuated by a solenoid 194 that is connected in series with the switches 131, 131' and 58. It will be apparent that if the machine will not operate following an operation that should clear the crossfooter 70, the machine operator is immediately signalled that something is wrong, such as an overdraft of an account, etc., which, of course, must be noted or corrected before proceeding further.

The clutch tripping mechanism includes a yoke type lever or bail 196 having an arm 198 arranged such that its end may be swung into position to abut a clutch component 200 of clutch 34 to disengage the clutch at the end of each cycle of operation of the machine. A second arm 202 of the bail 196 has a lug 204 which normally rests on a shoulder 206 on a lever 208, pivoted on a shaft 210. The lever 208 has a laterally extending arm 212 which engages and actuates a switch arm 214 of which only an upper end portion is shown, the switch 214 having an electric insulator on the upper end thereof for engagement by arm 212. The switch is of a well known type (shown and described in the above mentioned Butler patent) for controlling operation of the machine driving motor 36. When the parts of the devices of FIG. 2 are in the normal positions shown, and a machine cycling operation is initiated, the latching lever 208 is swung clockwise which releases the bail lever 196 which is then swung down by a spring 216, which allows the clutch component 200 to engage the other of the components of clutch 34 to connect the main cam shaft 32 to the driving motor 36. On completion of the cycle of operation, the bail 196 is relatched with arm 208 by mechanism including a stud 218 on an arm 220 cooperable with an arm 222 on bail 196.

The second signal, or lock 192, comprises a bail type lever 224 pivoted on a shaft 226 adjacent lever 208, the lever 224 having a latch arm 228 cooperable with a lug 230 on the arm 208. The latch arm 228 is shown in its normal or released position from which it may be swung down into latching engagement with lug 230. When this occurs, lever 208 is prevented from pivoting clockwise and bail 202 is locked in the position shown, in which the end of arm 198 abutting the end of clutch component 200 prevents engagement of the clutch components.

As previously mentioned, it is possible for the lower sensing fingers 124 to engage the recessed surfaces 129 of cams 128 thus indicating a crossfooter clear condition when in fact, the crossfooter condition is non-clear. In order to overcome the above mentioned condition, we provide a switch 232 which functions in response to the clearing of a negative amount from the crossfooter and cooperates with the sensing fingers 122 to energize both signals 188 and 192 when fingers 124 erroneously sense a crossfooter clear condition. The switch 232 is diagrammatically represented as comprising a movable contact 234 arranged to bridge either a pair of fixed contacts 236 or a second pair of fixed contacts 238. The switch contact 234 is connected to an operator or slide 240 which in the present machine slides vertically in accordance with the condition of the crossfooter, i.e., whether positive or negative. When contact 234 is in the position shown, engaging contacts 236, the crossfooter pinions are in position for add and subtract operations. When the amount in the crossfooter becomes negative, slide 240 is moved downward away from contacts 236 into engagement with contacts 238. The mechanism which operatively connects the slide 240 to the mechanism which shifts the pinions 72 and 74 between positive and negative positions, has not been shown or described in detail as such mechanism is well known and the details thereof may be had from a reference to the above mentioned patents to Butler.

With respect to the circuitry of the control system, the positive terminal of the battery 190 is connected to one terminal of switch 58 and a lead 242 connects the other terminal of switch 58 to one of the contacts 236 of switch 232. The other of the contacts 236 is connected by a lead 244 to the movable contact of switch 131 which has its fixed contact connected by a lead 246 to one end of the coil of solenoid 194, the other end of the coil being connected by a lead 248 to the negative terminal of the battery 190. As shown, the signal lamp 188 is connected in parallel with the coil of solenoid 194 across leads 246 and 248. The movable contact of switch 131' is connected by a lead 250 to one of the contacts 238 and the other of the contacts 238 is connected by a lead 252 to lead 242, and thus to switch 58. The fixed contact of switch 131' is connected by a lead 254 to lead 246 and thus like switch 131 is in series with switch 58 and solenoid 194.

*Operation*

In operation of the machine, after the operator has entered the required amounts, a motor bar is depressed to initiate cycling operation of the machine. As a result, the switch 212 is closed and lever 208 pivots clockwise to release bail 196 which then pivots clockwise to allow engagement of the components of clutch 34. Engagement of clutch 34 connects the cam shaft 32 to the motor 36 and cycling operation of the machine begins. Among other things, the sensing device 100 is pivoted to its retracted position, shown in FIG. 3, and the crossfooter 68 is pivoted clockwise to engage the amount racks 44 in the usual well known manner. The amounts are thus entered in the crossfooter by rotation of the pinions 72 to positions corresponding to the amounts, if desired, the said amounts may also be entered into the register 98 from the crossfooter. During the entry of the amounts into the crossfooter, the carriage moves accordingly and after all of the amounts have been entered, the final movement of the carriage closes switch 58 (see FIG. 2). During this time, the sensing device 100 is being held in its retracted position shown in FIG. 3 by the latch 144, out of the way of the crossfooter pinions 72, 74. When cam 40, approaching completion of the cycle of operation, reaches the point where the stud 176 carried thereby pivots latch 162 and releases slide 138, the slide moves forwardly and in so doing allows springs 136 to pivot the sensing device into sensing relation with the crossfooter pinions 72, 74. If the crossfooter pinions are clear of amounts, that is, are all in zero positions, then either the positive sensing fingers 122 or the negative sensing fingers 124 will engage the recessed portions 129 of the cams 128, depending upon whether the amount cleared from the crossfooter was a positive or negative amount. In the event that the amount cleared from the crossfooter is a positive amount, the slide 240 will remain in its raised position shown, bridging contacts 236. Also, the sensing device will rock to the position shown in FIG. 5, in which the upper sensing fingers 122 engage the recessed surface 129 of the cam 128. Rocking of the sensing device in the direction determined by engagement of fingers 122 with recessed cam surface 129 moves the switch blade of switch 131 to break the switch contacts, thus preventing operation of the non-clear signals 188 and 192. If the amount cleared from the crossfooter is a negative amount, the slide 240 will have moved away from contacts 236 and bridge contacts 238. If the crossfooter is clear, the lower sensing fingers 124 will engage the recessed surface 129 of the cam 128 and the accompanying rocking action of the sensing device will open switch 131' to prevent operation of the non-clear signals 188 and 192. If for any of the previously mentioned reasons, the pinions of the crossfooter are rotated such that the crossfooter contains all minus "9's," then the upper sensing fingers will engage in the slots against the recessed cam surfaces 129. This causes the sensing device to rock in a direction such that switch 131 is open, thus erroneously sensing a clear crossfooter condition. However, slide 240 has bridged the switch contacts 238 since the amount was a negative amount and overrides switch 131 by switching the circuit to switch 131'. Thus, the signals 188, 192 are operated to warn the machine operator that the crossfooter is not clear and indicating the possibility of an error having been made in the entries.

While we have shown and described our invention in considerable detail, it will be apparent to those skilled in the art that various modifications and variations of the invention may be made without departing from the spirit and scope of the invention.

What is claimed is:

1. In a calculating machine having a crossfooter pinion in which the teeth are respectively representative of characters 0 to 9 and rotatable in one direction to clear the pinion of a positive amount and in the opposite direction to clear the pinion of a negative amount, a system for indicating a clear or non-clear condition of the pinion comprising, a signal, a cam to rotate with the pinion and having a portion representative of the "0" tooth of the pinion, said portion locating in one position when the pinion is cleared of a positive amount and in a second position when the pinion is cleared of a negative amount, said portion also locating in said first position when the pinion is rotated in said opposite direction to the negative "9" position, a supporting member movable toward and away from said cam, a pair of sensing fingers carried by said supporting member to sense said cam and rockable on said supporting member, said sensing fingers spaced apart a distance such that only one of the fingers can sense said portion at a time, said fingers rocking in one direction on the sensing of said portion by one of the fingers and in the opposite direction on sensing of said portion by the other of said fingers, control means operatively connecting said sensing fingers and said signal and operable on rocking of said sensing fingers in either direction to render said signal ineffective, and a control responsive to rotation of the pinion to said negative "9" position to activate said signal irrespective of the sensing of said portion by said one finger.

2. In a calculating machine having a crossfooter pinion in which the teeth are respectively representative of characters 0 to 9 and rotatable in one direction to clear the pinion of a positive amount and in the opposite direction to clear the pinion of a negative amount, a system for indicating a clear or non-clear condition of the pinion comprising, a signal, a cam to rotate with the pinion and having a portion corresponding to the zero position on the pinion, said portion locating in one position when the pinion is cleared of a positive amount by rotation of the pinion in said one direction and locating in a second position radially spaced from the first position when cleared of a negative amount by rotation of the pinion in said opposite direction, said portion also locating in said one position upon rotation of the pinion in said opposite direction to the negative "9" position, a supporting member movable toward and away from said cam, a pair of sensing fingers carried by and mounted to rock on said supporting member to sense said cam, said fingers having sensing ends spaced apart a distance such that only one of the fingers can engage said portion at a time, said sensing fingers rockable in one direction on sensing of said portion by one of said fingers in said one position of said portion and rockable in the opposite direction on sensing of said portion in the said second position by the other of said fingers, a normally closed switch operatively connecting said fingers and said signal, said switch opened by the rocking action of said fingers in said one direction to indicate a clear condition of the pinion when cleared of a positive amount, a second normally closed switch operatively connecting said signal and said fingers and opened by the rocking action of said fingers when the pinion has been cleared of a negative amount, and a switch responsive to rotation of the pinion in said opposite direction to the negative "9" position to activate said signal irrespective of the sensing of said portion by said one finger.

3. In a calculating machine having a crossfooter pinion in which the teeth respectively represent digits 0 to 9 and rotatable in one direction to clear the pinion of a positive amount and in the opposite direction to clear the pinion of a negative amount, a system for indicating a clear or non-clear condition of the pinion comprising, an electrically operated signal operable when energized to indicate a non-clear condition of the pinion, a cam to rotate with the pinion and having a portion representative of zero on the pinion, said cam portion locating in one zero position when the pinion is rotated in said one direction on clearing a positive amount from the pinion and locating in a second zero position when the pinion is rotated in said opposite direction on clearing a negative amount from the pinion, said cam portion also locating in said first zero position on rotation of the pinion in said opposite direction to a negative "9" position, a supporting member movable toward and away from said cam, a pair of sensing fingers to sense said cam and rockably mounted on said supporting member, said sensing fingers spaced apart a distance such that only one of said fingers can engage said cam portion at a time, one of said sensing fingers sensing said cam portion when the latter is in said first position and the other of said sensing fingers sensing said cam portion when the latter is in said second position, a pair of switch operating members carried respectively by said rockable sensing fingers, a normally closed switch controlling said signal and operatively connected to one of said switch operating members, said switch opened by said one operating member when said one sensing finger senses said cam portion following the clearing of a positive amount from the pinion, a second normally closed switch in parallel with the first switch and opened by the other switch operating member on sensing of the cam portion by the other sensing finger, and a third switch responsive to rotation of the pinion in said opposite direction to a negative "9" position and series connected to said first switch to activate said signal to indicate a non-clear condition of the pinion irrespective of the sensing of said cam portion by said one finger.

References Cited in the file of this patent
UNITED STATES PATENTS

| | | |
|---|---|---|
| 1,490,989 | Sieweck | Apr. 22, 1924 |
| 2,106,273 | Fleming | Jan. 25, 1938 |
| 2,339,616 | Chase | Jan. 18, 1944 |